United States Patent
Zhou

(10) Patent No.: US 7,810,395 B2
(45) Date of Patent: Oct. 12, 2010

(54) ULTRASONIC PRESSURE SENSOR AND METHOD OF OPERATING THE SAME

(75) Inventor: Gan Zhou, Plano, TX (US)

(73) Assignee: Total Wire Corporation, Plano, TX (US)

( * ) Notice: Subject to any disclaimer, the term of this patent is extended or adjusted under 35 U.S.C. 154(b) by 386 days.

(21) Appl. No.: 11/927,889

(22) Filed: Oct. 30, 2007

(65) Prior Publication Data

US 2008/0229837 A1 Sep. 25, 2008

Related U.S. Application Data

(63) Continuation-in-part of application No. 11/315,546, filed on Dec. 22, 2005.

(60) Provisional application No. 60/891,986, filed on Feb. 28, 2007.

(51) Int. Cl.
*G01L 11/00* (2006.01)
(52) U.S. Cl. .......................... 73/703; 73/655; 356/502
(58) Field of Classification Search ....................... None
See application file for complete search history.

(56) References Cited

U.S. PATENT DOCUMENTS

| | | | | |
|---|---|---|---|---|
| 4,019,818 A | * | 4/1977 | Vilkomerson | 356/493 |
| 4,379,633 A | * | 4/1983 | Bickel et al. | 356/502 |
| 4,436,425 A | | 3/1984 | Cole | |
| 4,659,224 A | * | 4/1987 | Monchalin | 356/502 |
| 4,977,546 A | | 12/1990 | Flatley et al. | |
| 5,218,418 A | | 6/1993 | Layton | |
| 5,313,266 A | | 5/1994 | Keolian et al. | |
| 5,684,592 A | * | 11/1997 | Mitchell et al. | 356/493 |
| 5,726,444 A | | 3/1998 | Drummond | |
| 5,835,642 A | * | 11/1998 | Gelikonov et al. | 385/4 |
| 5,894,531 A | * | 4/1999 | Alcoz | 385/11 |
| 5,909,279 A | * | 6/1999 | Pepper et al. | 356/479 |
| 6,346,985 B1 | * | 2/2002 | Hall | 356/477 |
| 6,522,797 B1 | * | 2/2003 | Siems et al. | 385/12 |
| 7,095,505 B1 | * | 8/2006 | Beard et al. | 356/502 |
| 7,262,861 B1 | * | 8/2007 | Pepper et al. | 356/502 |

FOREIGN PATENT DOCUMENTS

GB 2407154 A 4/2005

OTHER PUBLICATIONS

PCT International Search Report and Written Opinion of the International Searching Authority.
Paul C. Beard, et al., "Characterization of a Polymer Film Optical Fiber Hydrophone for Use in the Range 1 to 20 MHz: A Comparison with PVDF Needle and Membrane Hydrophones" IEEE Transactions on Ultrasonics, Ferroelectrics, and Frequency Control, vol. 47, No. 1, Jan. 2000, pp. 256-264.

* cited by examiner

*Primary Examiner*—Lisa M Caputo
*Assistant Examiner*—Jermaine Jenkins

(57) ABSTRACT

An ultrasonic pressure sensor and a method of detecting ultrasonic pressure. In one embodiment, the ultrasonic pressure sensor includes: (1) an interferometer having a reference arm and a signal arm that includes a probing fiber, the probing fiber having a reflective coating at a distal end thereof and configured to couple to ultrasonic waves proximate the distal end, the interferometer configured to receive laser light and produce two output beams based on the ultrasonic waves and (2) a photodetector coupled to the interferometer and configured to generate electronic signals based on the two output beams.

20 Claims, 7 Drawing Sheets

ULTRASONIC PRESSURE SENSOR AND METHOD OF OPERATING THE SAME

This application is a continuation-in-part of U.S. patent application Ser. No. 11/315,546, filed by Zhou on Dec. 22, 2005, entitled "Image-Guided Laser Catheter" and is further based on U.S. Provisional Patent Application Ser. No. 60/891,986, filed by Zhou on Feb. 28, 2007, entitled "Ultrasonic Sensor," both commonly owned with this application and incorporated herein by reference.

TECHNICAL FIELD OF THE INVENTION

The invention is directed, in general, to ultrasonic pressure sensors and, more specifically, to an ultrasonic pressure sensor and a method of operating the same.

BACKGROUND OF THE INVENTION

An ultrasonic pressure sensor measures ultrasonic pressure and converts it into an electric voltage signal. These sensors are used widely in a variety of applications ranging from non-destructive testing of materials, marine biology, to medical imaging. In medical imaging, an ultrasonic transducer emits a high frequency pulse into a tissue, and acoustic echoes from the tissue are received by an ultrasonic pressure sensor which is typically implemented on the same transducer. Such a pulse-echo technique can help synthesize a gray-scale tomographic image of tissue's mechanical (or acoustic) properties. One of the most successful ultrasonic imaging devices today is the intravascular ultrasound, or IVUS.

Piezoelectric materials, such as lead zirconate titanate (PZT) or polyvinylidene difluoride (PVDF), have been used to make ultrasonic pressure sensors for many applications. PZT is a ceramic polycrystal with an inherent grain size that makes it difficult to machine and package to small dimensions unless it is attached to a larger substrate. PVDF, which is a polymer, must be electrically poled before it exhibits piezoelectricity, and its sensitivity is lower than that of PZT. Furthermore, the piezoelectric signal is a very small electric voltage that is subject to transmission line loss and electromagnetic interference. For transmission over a long distance such as from a catheter's distal end to its proximal end, the piezoelectric signals typically must be shielded by small coaxial cables and pre-amplified by a chip incorporated near the tip of the catheter. The need to shield and pre-amplify signals makes it hard to construct piezoelectric sensors with a very small profile.

Capacitive ultrasonic pressure sensors are being developed by several companies, and they have some interesting properties. They are a type of MEMS device fabricated using silicon processing technologies developed in the semiconductor industry. However, these devices are costly to make, and reliability issues are associated with the need to forward-bias the sensing capacitors.

Optical ultrasonic pressure sensors have been proposed and studied by several research groups around the world. In a design described in Beard, et al., "Characterisation of a Polymer Film Optical Fibre Hydrophone for the Measurement of Ultrasound Fields for Use in the Range 1-30 MHz: a Comparison with PVDF Needle and Membrane Hydrophones," IEEE Transactions on Ultrasonics, Ferroelectrics and Frequency Control, Vol. 47, No. 1, January 2000, a thin Fabry-Perot etalon is formed on the distal tip of an optical fiber. Laser light is launched into the fiber from a proximal end of the optical fiber and is subsequently reflected back by the Fabry-Perot etalon and received by a photodetector. Ultrasonic waves interacting with the distal end of the fiber modulates the cavity length of the Fabry-Perot and causes a change in the reflected light intensity. For this sensor to function properly, the thickness of the polymer Fabry-Perot etalon must be controlled to a very high precision during fabrication, which is difficult to do. Furthermore, changes in application environment such as temperature and pressure can significantly alter the Fabry-Perot etalon property and negatively impact sensor performance. In addition, the high frequency response for this design is restricted by the finite thickness of the etalon layer, and the sensor has limited capability in the lateral probing geometry.

Among other things, what is needed in the art is an ultrasonic pressure sensor that addresses some of the shortcomings of the prior art that are described above.

SUMMARY OF THE INVENTION

To address the above-discussed deficiencies of the prior art, one aspect of the invention provides an ultrasonic pressure sensor. In one embodiment, the ultrasonic pressure sensor includes: (1) an interferometer having a reference arm and a signal arm that includes a probing fiber, the probing fiber having a reflective coating at a distal end thereof and configured to couple to ultrasonic waves proximate the distal end, the interferometer configured to receive laser light and produce two output beams based on the ultrasonic waves and (2) a photodetector coupled to the interferometer and configured to generate electronic signals based on the two output beams.

Another aspect of the invention provides a method of detecting ultrasonic pressure. In one embodiment, the method includes: (1) coupling ultrasonic waves into a distal end of a probing fiber of an interferometer having a reference arm and a signal arm that includes the probing fiber, the probing fiber having a reflective coating at the distal end, (2) providing laser light to the interferometer, the interferometer producing two output beams based on the ultrasonic waves and (3) generating electronic signals based on the two output beams.

The foregoing has outlined certain aspects and embodiments of the invention so that those skilled in the pertinent art may better understand the detailed description of the invention that follows. Additional aspects and embodiments will be described hereinafter that form the subject of the claims of the invention. Those skilled in the pertinent art should appreciate that they can readily use the disclosed aspects and embodiments as a basis for designing or modifying other structures for carrying out the same purposes of the invention. Those skilled in the pertinent art should also realize that such equivalent constructions do not depart from the scope of the invention.

BRIEF DESCRIPTION OF THE DRAWINGS

For a more complete understanding of the invention, reference is now made to the following descriptions taken in conjunction with the accompanying drawings, in which.

DETAILED DESCRIPTION

Figure 1:
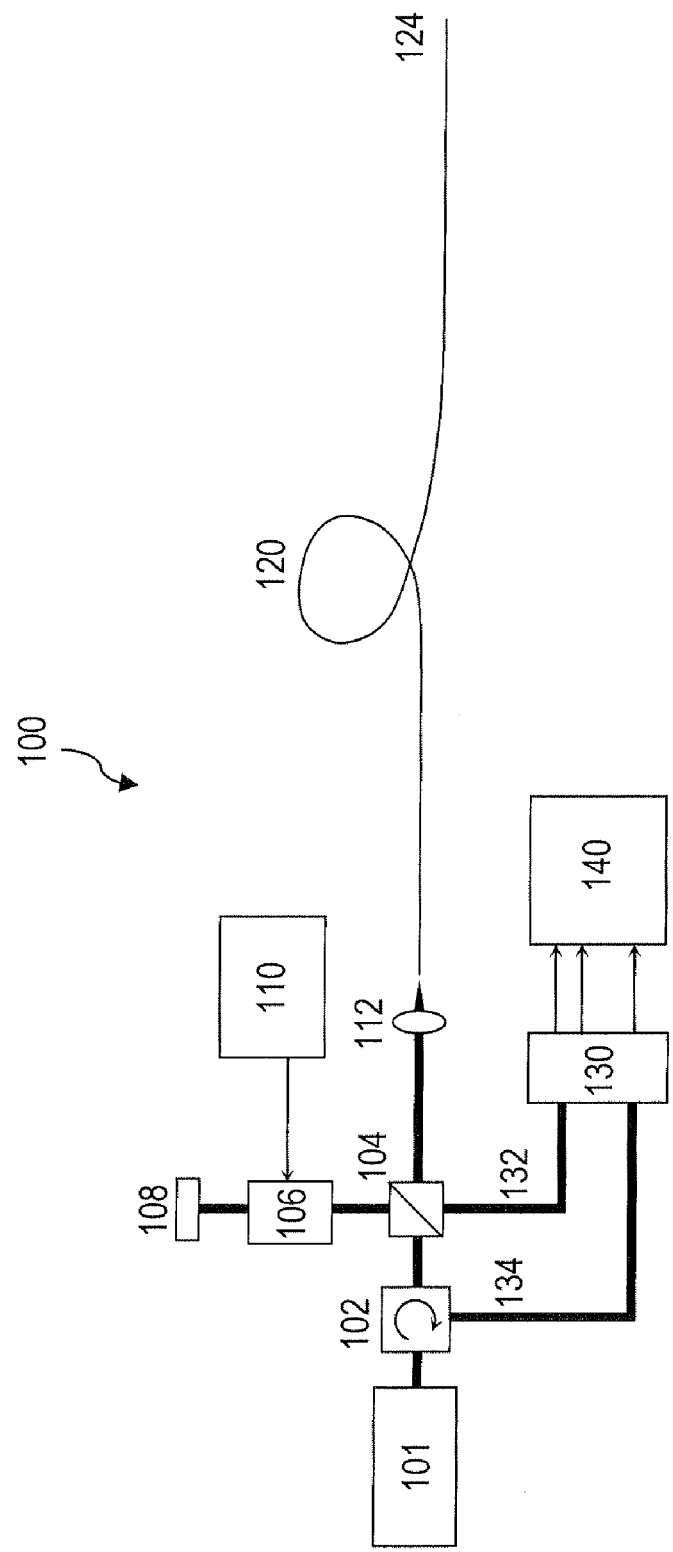
FIG. 1 illustrates a schematic view of one embodiment of an ultrasonic pressure sensor constructed according to the principles of the invention.

FIG. 1 illustrates a schematic view of one embodiment of an ultrasonic pressure sensor 100 constructed according to the principles of the invention. The ultrasonic pressure sensor 100 employs the structure of a Michelson interferometer. Laser light from a laser 101 passes through an optical circulator 102, a beamsplitter 104 and a focusing lens 112 and couples into an optical fiber 120. The optical fiber 120 serves as the probe for the ultrasonic pressure sensor 100; for this reason the optical fiber 120 will be referred to hereinafter as a probing fiber 120. The beamsplitter 104 also splits off part of the laser light and directs it to pass through an optical phase shifter 106 and reflect off a mirror 108. A distal (or far) end 124 of the probing fiber 120 has a reflective coating at its tip, so that laser light reaching the distal end 124 is substantially reflected back. The two reflected beams of light from the mirror 108 and from the fiber distal end 124 back-propagate and are combined in the beamsplitter 104. The beamsplitter 104 reflects a part of the combined beam (producing an output beam 132) and passes another part of the combined beam which thereafter enters the optical circulator 102 and is subsequently routed to an exit port thereof (producing an output beam 134). The optical circulator 102 may be a commercially available optical isolator (e.g., Model No. IO-3-532-VHP from the OFR division of Thorlabs, Inc., of Newton, N.J., with its "reject" port acting as the exit port). A balanced photodetector 130 receives both of the output beams 132, 134. A signal processor 140 acquires, conditions and stores or displays the signal from the balanced photodetector 130. Also shown in the diagram is a driver 110 for the optical phase shifter 106.

As stated above, the ultrasonic pressure sensor 100 employs the structure of a Michelson interferometer. The signal arm of the interferometer includes the beamsplitter 104, the focusing lens 112 and the probing fiber 120. The reference arm of the interferometer includes the beamsplitter 104, the optical phase shifter 106 and the mirror 108. The two outputs of the interferometer are the two output beams 132, 134. Ultrasonic waves interacting with any part of the probing fiber 120 can cause a change in either the refractive index, the optical pathlength on part of the probing fiber 120 or both. This results in a phase change, or phase shift, in the signal arm.

A simplified model will now be used to explain the theoretical operation of the ultrasonic pressure sensor 100. The simplified model is not meant to be a complete or exact description of the physics involved, but as an illustration of the essence of relevant principles. The electromagnetic field amplitude of the two interferometer output beams 132, 134 can be written respectively as:

$$Ea = \{Er\exp(i\Phi r) + Es\exp(i\Phi s + i\Phi u)\}/\sqrt{2} \quad (1)$$

and $$Eb = \{Er\exp(i\Phi r) - Es\exp(i\Phi s + i\Phi u)\}/\sqrt{2}, \quad (2)$$

where Ea is the field amplitude of the output beam 132, and Eb is the field amplitude of the output beam 134. Er is the field amplitude of the light beam in the reference arm, and Es is the field amplitude of the light beam in the signal arm. $\Phi r$ is the optical phase of the reference arm, and $\Phi s$ is the optical phase of the signal arm excluding any ultrasound-induced phase change. $\Phi u$ denotes the part of the optical phase contributed by any ultrasound. From equations (1) and (2) the respective intensities of the two interferometer output beams 132, 134 are:

$$Ia = (Ir + Is)/2 + \sqrt{IrIs}\cos(\Phi - \Phi u) \quad (3)$$

and $$Ib = (Ir + Is)/2 - \sqrt{IrIs}\cos(\Phi - \Phi u), \quad (4)$$

where $\Phi = \Phi r - \Phi s$ is called the interferometer phase (or phase bias), which is the relative phase between reference arm and signal arm, excluding any contributions from ultrasound.

Figure 2:
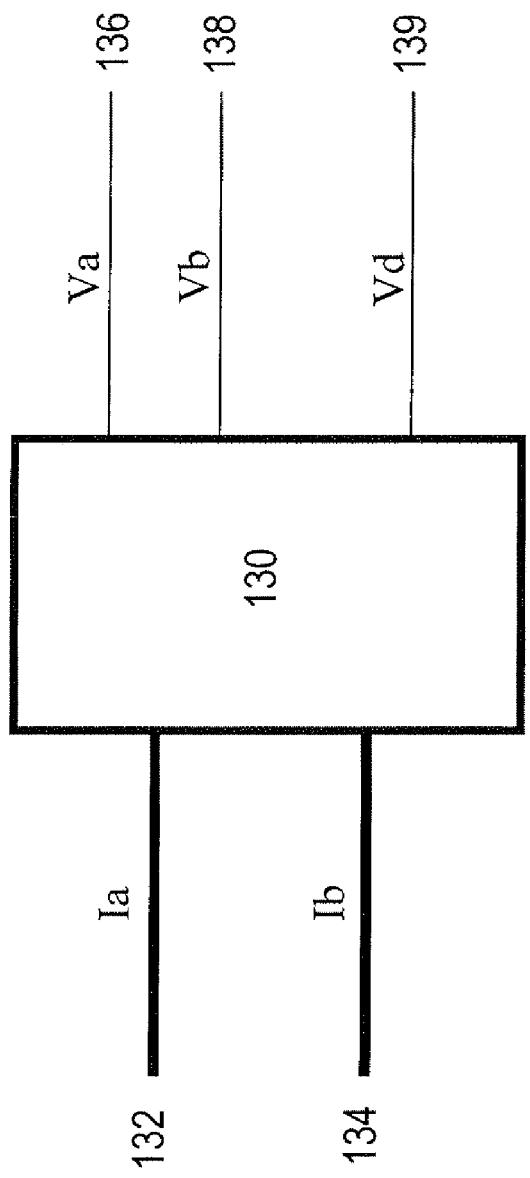
FIG. 2 illustrates a schematic view of one embodiment of a balanced photodetector that may be used in various embodiments of an ultrasonic pressure sensor constructed according to the principles of the invention.

FIG. 2 illustrates a schematic view of one embodiment of the balanced photodetector 130 of FIG. 1. A balanced photodetector is usually constructed from a pair of well-matched photodiodes and trans-impedance amplifiers. Since the ways in which a balanced photodetector may be constructed are well known in the art, they will not be further described here. The photodetector 130 receives both of the interferometer output beams 132, 134, and produces at an output port 136 thereof a voltage signal Va that is proportional to the intensity Ia and at an output port 138 thereof a voltage signal Vb that is proportional to the intensity Ib. It is apparent from equations (3) and (4) that both Va and Vb contain information about the ultrasound through the phase shift $\Phi u$. However, the background laser intensity (the first term on the right-hand side of either equation (3) or (4)) presents a significant noise to measurement due to the inherent noise in laser intensity. For this and other reasons, the balanced photodetector 130 also generates a third signal Vd at the output port 139 which is proportional to the difference between the two intensities Ia and Ib, viz.:

$$Vd = 2\gamma\sqrt{IrIs}\cos(\Phi - \Phi u), \quad (5)$$

where γ is a proportionality constant determined by such factors as the photodiode responsivity and the balanced photodetector's trans-impedance gain. Equation (5) shows that the additive terms in laser intensity fluctuations are essentially removed from the differential output Vd, thereby improving detection sensitivity. However, it should be noted that the relatively simple model above, and hence equation (5), does not take into account well-known quantum noise (often called "shot noise") that causes laser intensity to fluctuate in a random manner. In reality the differential output Vd contains shot noise in addition to the signal term shown in equation (5).

When the interferometer phase bias $\Phi$ is $\pi/2$, equation (5) can be approximated as:

$$Vd = 2\gamma\sqrt{IrIs}\Phi u \quad (6)$$

where it is assumed that the ultrasound-induced phase shift $\Phi u \ll 1$, which is usually the case. From equation (6) it is apparent that the differential signal Vd is proportional to the ultrasound-induced phase shift. The detection sensitivity is ultimately limited by the laser shot noise.

The interferometer phase bias Φ can be affected by many uncertain factors such as temperature, vibration, mechanical stress and air currents in the reference and signal arms. Left uncontrolled, Φ can drift randomly on a relatively slow time scale. Generally speaking, when Φ is not π/2, a change in detection sensitivity occurs that varies from that given by equation (6). Several ways exist to manage interferometer phase drift, as explained below.

Figure 3:
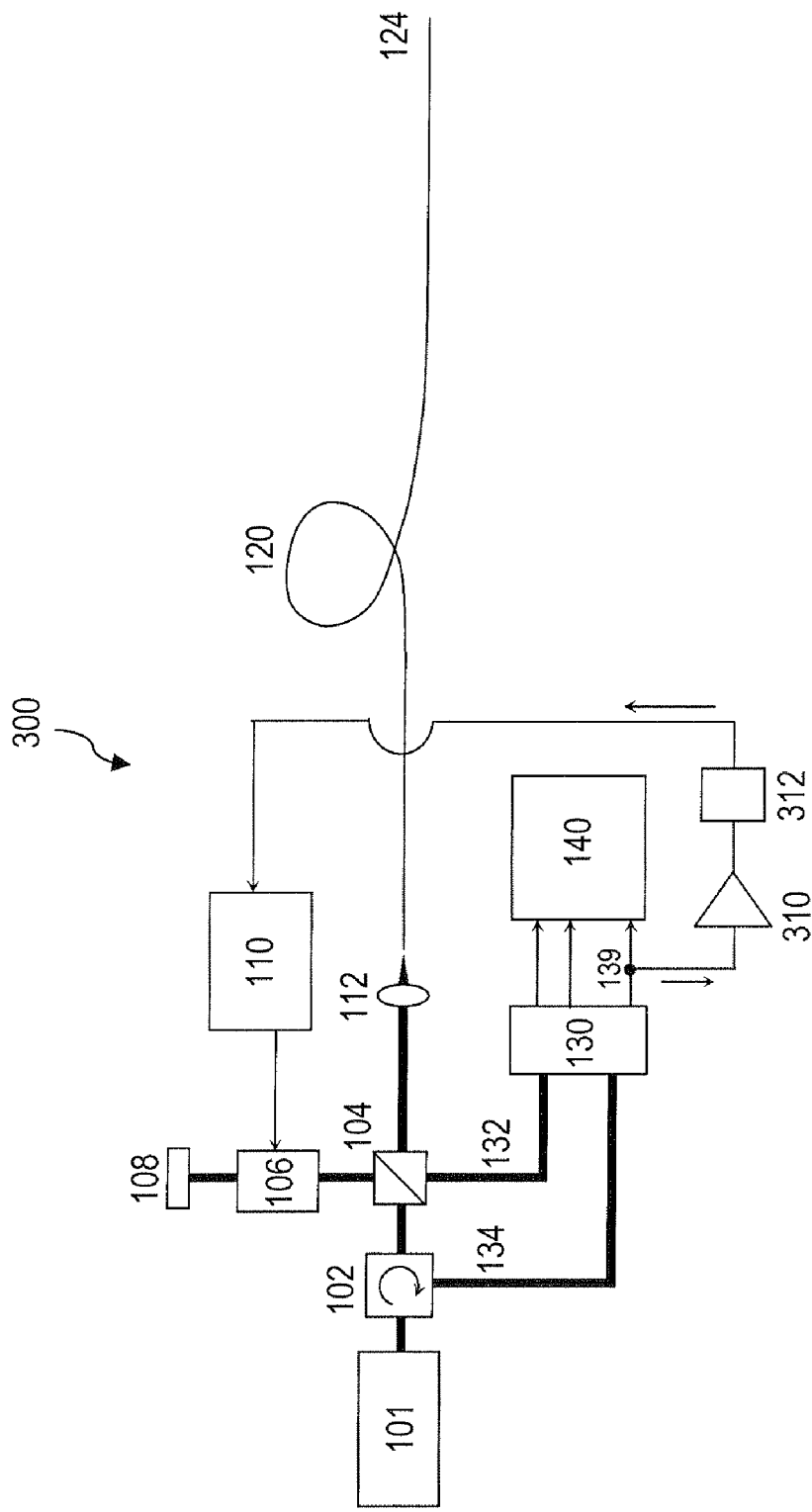
FIG. 3 illustrates a schematic view of one embodiment of an ultrasonic pressure sensor constructed according to the principles of the invention in which interferometer phase is controlled by means of a feedback loop.

FIG. 3 illustrates a schematic view of one embodiment of an ultrasonic pressure sensor 300 constructed according to the principles of the invention in which interferometer phase is controlled by means of a feedback loop. The ultrasonic pressure sensor 300 has an extra amplifier/signal processor 310 and a low-pass filter 312 whose output is connected to the control input of the driver 110 of the optical phase shifter 106. The differential output 139 from the balanced photodetector 130 is amplified by the extra amplifier/signal processor 310, filtered by the low-pass filter 312, and controls the amount of phase shift generated by the phase shifter 106. A nonzero output at the port 139 represents a deviation, or error, of the interferometer phase bias Φ from the desired π/2 value; this error signal is communicated to the phase shifter 106 so that an opposite phase change in the reference arm is generated to compensate for the error. Typically, the amplifier gain and filter time constant are adjusted to optimize the feedback loop response. When this feedback loop is activated and properly tuned, the interferometer phase bias can be "locked" to a value very close to π/2. It is noted here that by providing different amounts of attenuation in either the interferometer output beams 132, 134, the feedback loop shown in FIG. 3 can also lock the interferometer phase bias to values other than π/2, which may be desirable for other signal detection applications. An alternative technique employs a small amplitude, high frequency "dithering" of the phase shifter 106 along with a lock-in amplifier to detect the phase error signal and then compensate for the phase error using the same phase shifter. Still other techniques for phase-locking an interferometer are known in the art and will not be further described here.

Figure 4:
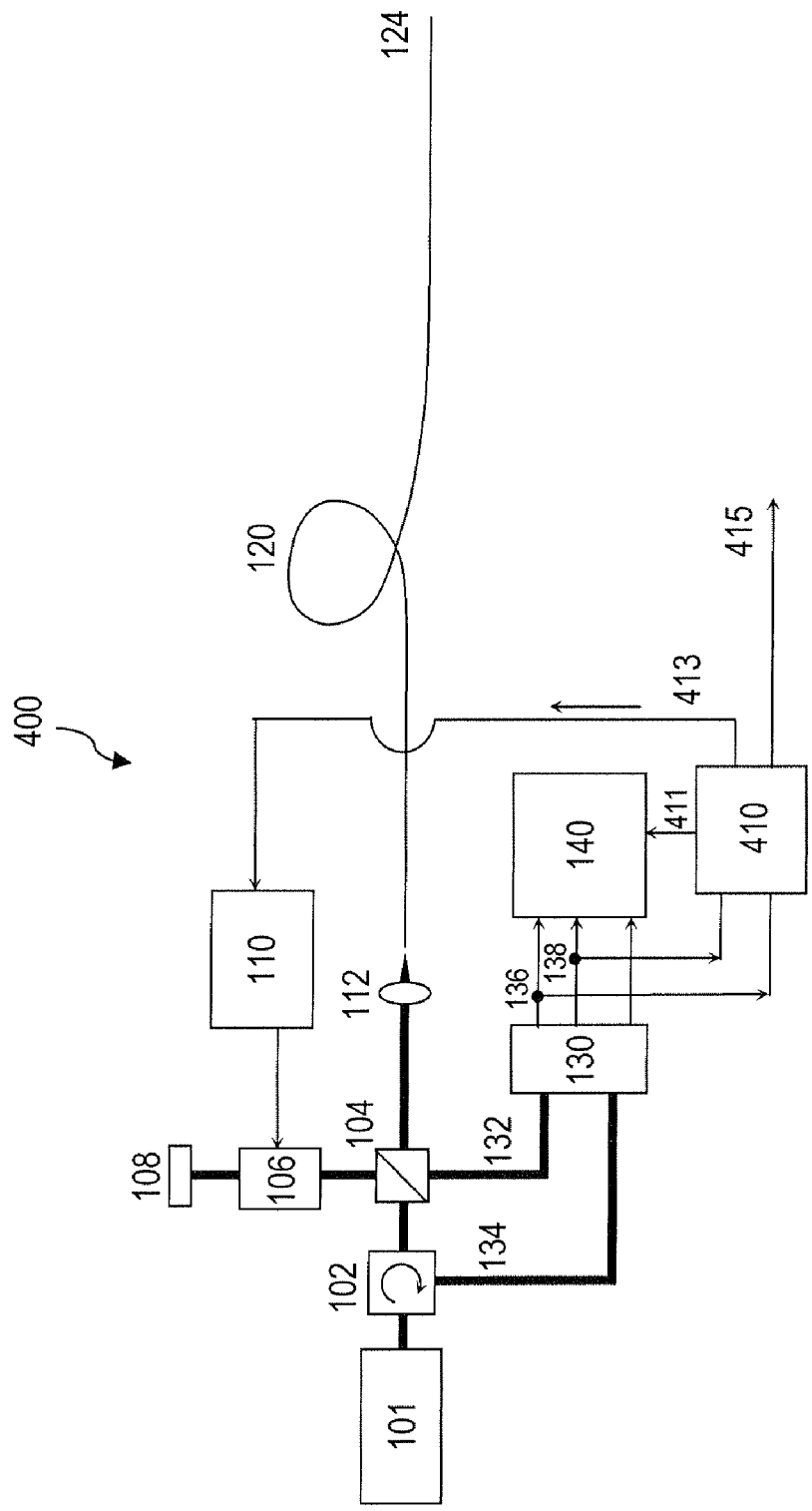
FIG. 4 illustrates a schematic view of another embodiment of an ultrasonic pressure sensor constructed according to the principles of the invention in which interferometer phase drift is managed.

FIG. 4 illustrates a schematic view of another embodiment of an ultrasonic pressure sensor 400 constructed according to the principles of the invention in which interferometer phase drift is managed. In the embodiment of FIG. 4, the interferometer phase bias is actively monitored but not necessarily controlled at all times. It is suitable for pulse-echo imaging and other applications where ultrasonic sensing is triggered by a pulse. The ultrasonic pressure sensor 400 has a controller 410 that monitors and controls the pulse-echo imaging. The controller 410 also receives Va and Vb, which it will be recalled are generated at the output ports 136, 138 of the balanced photodetector 130. The controller 410 can also send a command signal 413 to the phase shifter driver 110 which causes the phase shifter 106 to generate a phase shift. The command signal 413 can be, for example, a periodic triangular ramp signal that scans the interferometer phase shift to sweep continuously through a set of values. By monitoring the interferometer output beams while actively scanning the interferometer phase shift, the controller 410 "interrogates" the interferometer and finds the phase bias value. Once the correct phase bias is reached, the controller 410 can temporarily suspend the scanning and sends a signal 415 to trigger an ultrasonic pulse generator (not shown) to transmit an appropriate ultrasonic pulse. The controller 410 also sends another signal 411 to trigger the signal processor 140 to start the sensor data acquisition. The above control sequence is completed over a time interval much shorter than the time scale over which significant phase drift can happen in the interferometer. In one embodiment, the control sequence can take anywhere from about 10 microseconds to about 10 milliseconds. Once triggered, the ultrasonic echo signal can be acquired within, for example, less than about 1 to about 100 microseconds, depending on the particular application.

Figure 5:
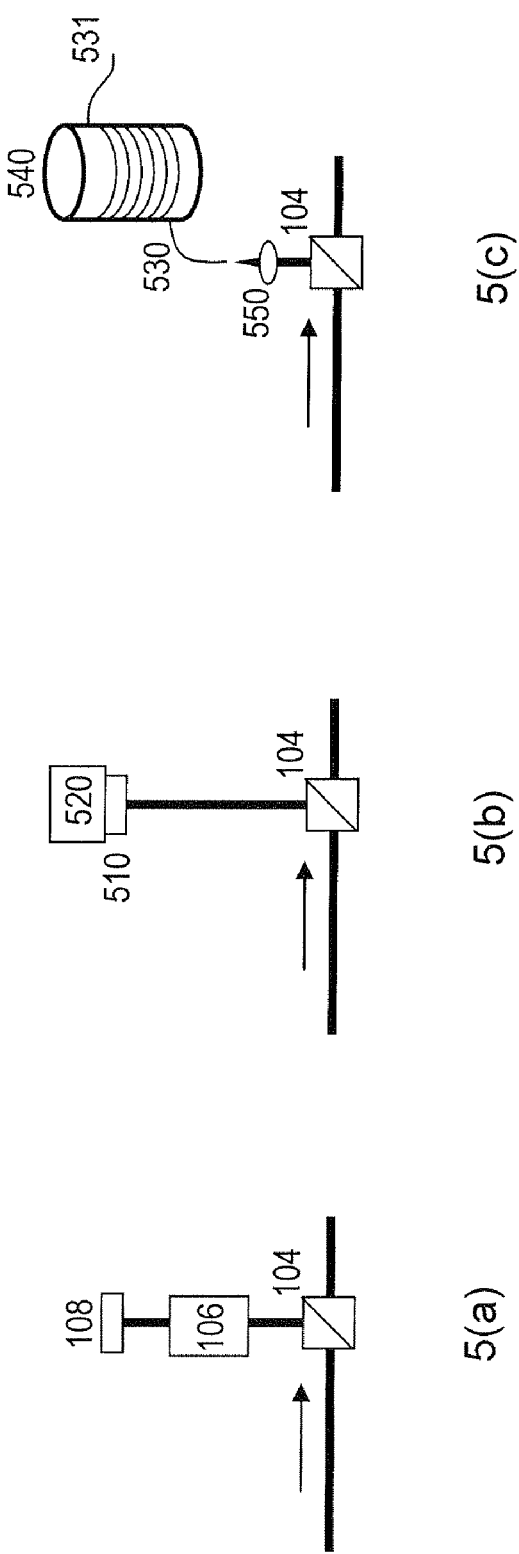
FIGS. 5A-C illustrate various embodiments of an optical phase shifter that can be implemented in a reference arm of an interferometer and according to the principles of the invention.

FIGS. 5A-C illustrate various embodiments of an optical phase shifter that can be implemented in a reference arm of an interferometer and according to the principles of the invention. FIG. 5A shows an electro-optic modulator implementation of the phase-shifter 106. As is known in the art, the electro-optic modulator can be made of a crystal whose refractive index changes according to the voltage applied across it. In another embodiment, a liquid crystal cell can also be used as the phase shifter 106 in FIG. 5A. FIG. 5B shows a phase shifter implemented by attaching a mirror 510 to a piezoelectric stack 520. A voltage applied across the piezoelectric stack causes the mirror 510 to move towards or away from the incident light, therefore changing the optical phase of the reference arm. FIG. 5C shows a phase shifter implemented by coupling light in the reference arm into an optical fiber 530 (referred to hereinafter as a reference fiber 530) using a focusing lens 550. The far end 531 of the reference fiber 530 has a reflective coating so that light reaching the far end is substantially reflected back. Part of the reference fiber 530 is coiled around a piezoelectric spool 540. By varying the voltage applied to the piezoelectric spool 540, different amount of stress can be applied to the reference fiber 530, resulting in changes in optical phase for the reference arm.

FIGS. 6A-E illustrate various ways in which ultrasonic waves can be coupled to a probing fiber (e.g., the probing fiber 120 of FIG. 1) according to the principles of the invention. For the purpose of explaining the coupling mechanism, the distal end 124 of the probing fiber 120 is shown in greater detail.

Figure 6:
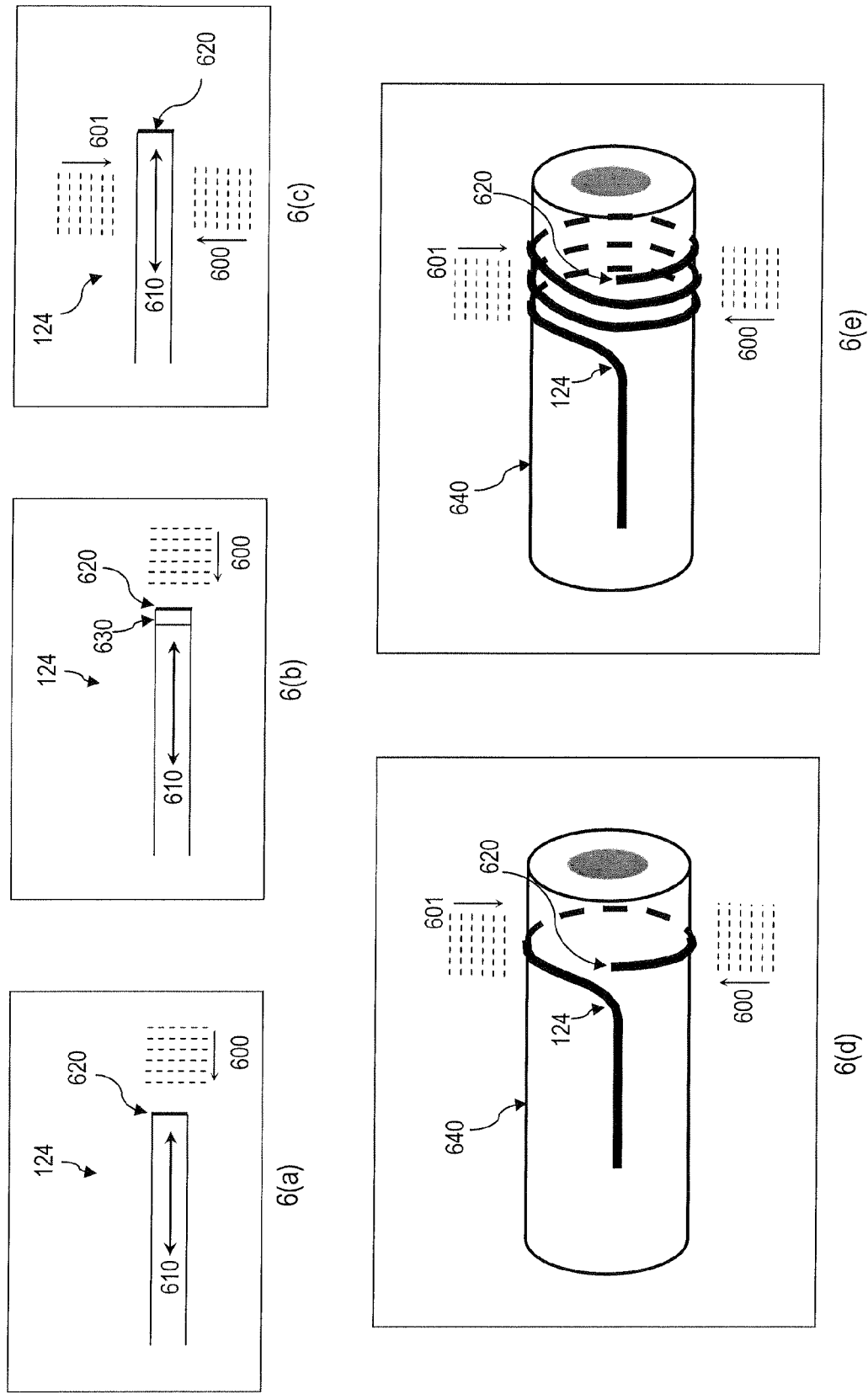
FIGS. 6A-E illustrate various ways in which ultrasonic waves can be coupled to a probing fiber according to the principles of the invention.

FIG. 6A shows an embodiment of an endoscopic probing technique, where ultrasonic waves 600 are incident from a direction roughly along the probing fiber's longitudinal axis. Light 610 propagating in the distal end 124 of the probing fiber 120 is reflected back by a mirror surface 620 which can be a layer of reflective coating deposited on the distal end 124 of the probing fiber 120.

A simplified model will now be used to explain how ultrasound may be coupled into the probing fiber 120 for the embodiment of endoscopic probing technique of FIG. 6A. The simple model is not meant to be a complete or exact description of the physics involved, but as an illustration of relevant principles. The ultrasonic waves 600 are coupled into the distal end 124 of the probing fiber 120 following the approximate relations:

$$P_f = P_o \cdot 2Z_f/(Z_o + Z_f) \quad (7)$$

and $$\delta = (\lambda_u/2\pi) P_f / B_f, \quad (8)$$

where $P_f$ is the ultrasonic pressure amplitude coupled into the distal end 124 of the probing fiber 120, $P_o$ is the ultrasonic pressure amplitude incident onto the probing fiber 120, and $Z_f$ and $Z_o$ are the acoustic impedances of the probing fiber 120 and the surrounding medium, respectively. $\delta$ is the displacement amplitude experienced by the mirror surface 620 due to ultrasonic coupling, $\lambda_u$ is the ultrasonic wavelength in the probing fiber 120, and $B_f$ is the bulk modulus of the probing fiber 120. Therefore, ultrasound-induced phase shift in the signal arm of interferometer is approximately $$\Phi_u = 2\delta \cdot (2\pi n/\lambda), \quad (9)$$

where n is the refractive index of the probing fiber 120, and λ is the optical wavelength.

FIG. 6B shows another example embodiment of the endoscopic probing technique. A thin layer of flexible material 630, such as a suitable polymer, is deposited between the distal end 124 of the probing fiber 120 and the mirror surface 620. The layer 630 preferably has a refractive index matching that of the probing fiber 120 and a thickness roughly equal to a quarter of the ultrasonic wavelength in itself. The low bulk modulus and the quarter-wave thickness of the layer 630 can both help increase the ultrasound-induced displacement in the mirror surface 620 and thus improving ultrasonic sensitivity.

FIG. 6C shows an example embodiment of a lateral probing technique, where the ultrasonic waves are incident from a direction approximately perpendicular to the longitudinal axis of the distal end 124 of the probing fiber 120. Ultrasonic waves 600 or 601 are coupled into the distal end 124 of the probing fiber 120 from the side, causing a small amount of displacement and/or refractive index change in the interface layer between the core and cladding of the probing fiber 120. Since the light 610 in the probing fiber 120 is effectively total-internally-reflected many times by the core/cladding interface layer during propagation, the optical phase of the light 610 is modulated by any perturbation to the core/cladding interface layer. The fundamental physics of ultrasound coupling into the interferometer in the lateral probing technique is similar to that discussed previously in the endoscopic probing technique. In practical applications, however, the lateral probing technique has a few important advantages compared to the endoscopic probing technique. The ultrasonic sensitivity for this technique is usually higher than the endoscopic technique. This is because the light 610 reflects off the core/cladding interface layer many times over even a very short distance, therefore the effect of interface perturbation on optical phase is multiplied accordingly, resulting in higher sensitivity. Another important advantage is that the lateral probing technique allows the same probing fiber 120 to sense multiple ultrasonic waves propagating in different directions in the plane approximately perpendicular to the longitudinal axis of the distal end 124 of the probing fiber 120. Therefore in the lateral probing technique, the probe functions omni-directionally in the plane perpendicular to its longitudinal axis.

FIG. 6D shows an alternative embodiment of the lateral probing technique. This geometry can be useful for applications where the probing fiber 120 is embedded in an elongated cylindrical object such as a catheter or a guidewire. The presence of other objects in a catheter or guidewire may prevent the probing fiber 120 from sensing ultrasound from all desired directions. In FIG. 6D, the distal end 124 of the probing fiber 120 coils around near the outer diameter of a catheter 640, so that ultrasonic waves from multiple directions, such as the ultrasonic waves 600 or 601, can be sensed by the same probing fiber 120. The distal end 124 of the probing fiber 120 similarly has a mirror surface 620 deposited on it. In FIG. 6E, an alternative embodiment of lateral probing technique is shown, where the distal end 124 of the probing fiber 120 is coiled around a catheter 640 multiple times, so that the ultrasonic sensitivity is approximately multiplied by the number of turns in the coil.

Figure 7:
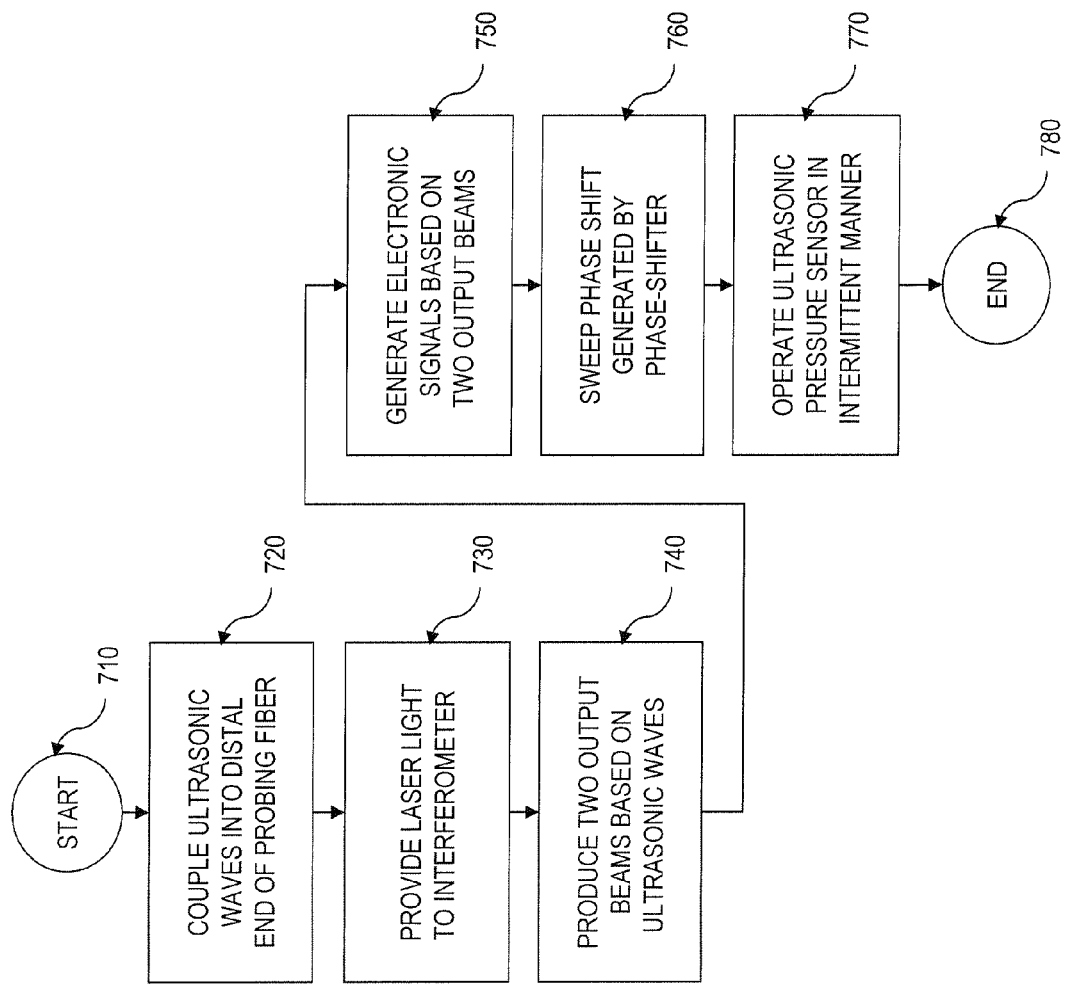
FIG. 7 illustrates a flow diagram of one embodiment of a method of detecting ultrasonic pressure carried out according to the principles of the invention.

FIG. 7 illustrates a flow diagram of one embodiment of a method of detecting ultrasonic pressure carried out according to the principles of the invention. The method begins in a start step 710. In a step 720, ultrasonic waves are coupled into a distal end of a probing fiber of an interferometer having a reference arm and a signal arm that includes the probing fiber.

The probing fiber has a reflective coating at the distal end. In a step 730, laser light is provided to the interferometer. In a step 740, the interferometer produces two output beams based on the ultrasonic waves. In a step 750, electronic signals are generated based on the two output beams. The electronic signals are therefore based on the ultrasonic waves. In one embodiment, the electronic signals include two voltage signals proportional to intensities of the two output beams and a further voltage signal proportional to a difference between the intensities.

In a step 760, the phase shift generated by the phase-shifter may be caused to sweep through a range of values, and the electronic signals may be monitored to determine a phase bias of the ultrasonic pressure sensor. In a step 770, the ultrasonic pressure sensor may be operated in an intermittent manner. The ultrasonic pressure sensor may be caused to sense ultrasonic waves with a controller coupling the photodetector and the driver. The method ends in an end step 780.

Those skilled in the art to which the invention relates will appreciate that other and further additions, deletions, substitutions and modifications may be made to the described embodiments without departing from the scope of the invention.

What is claimed is:

1. An ultrasonic pressure sensor, comprising:
   an interferometer having a reference arm and a signal arm that includes a probing fiber, said probing fiber having a reflective coating at a distal end thereof and configured to couple to ultrasonic waves proximate said distal end, said interferometer configured to receive laser light and produce two output beams based on said ultrasonic waves; and
   a photodetector coupled to said interferometer and configured to generate electronic signals based on said two output beams.

2. The ultrasonic pressure sensor as recited in claim 1 wherein said ultrasonic wave is incident to said distal end from a direction selected from the group consisting of:
   substantially along a longitudinal axis of said probing fiber, and
   substantially perpendicular said longitudinal axis.

3. The ultrasonic pressure sensor as recited in claim 1 wherein said photodetector is a balanced photodetector that generates two voltage signals proportional to intensities of said two output beams and a further voltage signal proportional to a difference between said intensities.

4. The ultrasonic pressure sensor as recited in claim 1 further comprising an optical circulator, said reference arm including an optical phase-shifter having a driver coupled thereto and said signal arm further including a focusing lens.

5. The ultrasonic pressure sensor as recited in claim 4 further comprising a feedback loop including a low-pass filter and coupling said photodetector and said driver and configured to control phase shift generated by said phase-shifter.

6. The ultrasonic pressure sensor as recited in claim 4 further comprising a controller coupling said photodetector and said driver and configured to cause phase shift generated by said phase-shifter to sweep through a range of values, monitor said electronic signals to determine a phase bias of said ultrasonic pressure sensor and thereafter cause said ultrasonic pressure sensor to sense ultrasonic waves.

7. The ultrasonic pressure sensor as recited in claim 1 wherein said phase-shifter is selected from the group consisting of:
   an electro-optic modulator,
   a mirror coupled to a piezoelectric stack, and a focusing lens coupled to a reference fiber located about a piezoelectric spool.

8. The ultrasonic pressure sensor as recited in claim 1 further comprising a layer of flexible material interposing said distal end of said probing fiber and said reflective coating.

9. The ultrasonic pressure sensor as recited in claim 8 wherein said probing fiber and said flexible material have matching refractive indices and said probing fiber has a thickness of about a quarter of a wavelength of said ultrasonic waves.

10. The ultrasonic pressure sensor as recited in claim 1 wherein said probing fiber is coiled at least once around an elongated cylindrical object.

11. A method of detecting ultrasonic pressure, comprising:
coupling ultrasonic waves into a distal end of a probing fiber of an interferometer having a reference arm and a signal arm that includes said probing fiber, said probing fiber having a reflective coating at said distal end;
providing laser light to said interferometer, said interferometer producing two output beams based on said ultrasonic waves; and
generating electronic signals based on said two output beams.

12. The method of detecting ultrasonic pressure as recited in claim 11 wherein said ultrasonic wave is incident to said distal end from a direction selected from the group consisting of:
substantially along a longitudinal axis of said probing fiber, and
substantially perpendicular said longitudinal axis.

13. The method of detecting ultrasonic pressure as recited in claim 11 wherein said photodetector is a balanced photodetector, said method further comprising generating two voltage signals proportional to intensities of said two output beams and a further voltage signal proportional to a difference between said intensities.

14. The method of detecting ultrasonic pressure as recited in claim 11 wherein said interferometer further has an optical circulator, said reference arm including an optical phase-shifter having a driver coupled thereto and said signal arm further including a focusing lens.

15. The method of detecting ultrasonic pressure as recited in claim 14 further comprising controlling phase shift generated by said phase-shifter with a feedback loop including a low-pass filter and coupling said photodetector and said driver.

16. The method of detecting ultrasonic pressure as recited in claim 14 further comprising:
causing phase shift generated by said phase-shifter to sweep through a range of values;
monitoring said electronic signals to determine a phase bias of said ultrasonic pressure sensor; and
thereafter causing said ultrasonic pressure sensor to sense ultrasonic waves with a controller coupling said photodetector and said driver.

17. The method of detecting ultrasonic pressure as recited in claim 11 wherein said phase-shifter is selected from the group consisting of:
an electro-optic modulator,
a mirror coupled to a piezoelectric stack, and
a focusing lens coupled to a reference fiber located about a piezoelectric spool.

18. The method of detecting ultrasonic pressure as recited in claim 11 wherein said interferometer further has a layer of flexible material interposing said distal end of said probing fiber and said reflective coating.

19. The method of detecting ultrasonic pressure as recited in claim 18 wherein said probing fiber and said flexible material have matching refractive indices and said probing fiber has a thickness of about a quarter of a wavelength of said ultrasonic waves.

20. The method of detecting ultrasonic pressure as recited in claim 11 wherein said probing fiber is coiled at least once around an elongated cylindrical object.

* * * * *

UNITED STATES PATENT AND TRADEMARK OFFICE
CERTIFICATE OF CORRECTION

PATENT NO. : 7,810,395 B2
APPLICATION NO. : 11/927889
DATED : October 12, 2010
INVENTOR(S) : Gan Zhou Page 1 of 1

It is certified that error appears in the above-identified patent and that said Letters Patent is hereby corrected as shown below:

Title Page

(73) Assignee: "Total Wire Corporation, Plano, TX (US)"
should read:
--Tea Time Partners, L.P., Rockwall, TX (US)--

Signed and Sealed this
Tenth Day of May, 2011

David J. Kappos
*Director of the United States Patent and Trademark Office*